Patented June 15, 1948

2,443,221

UNITED STATES PATENT OFFICE 2,443,221

METHOD OF MAKING GREASE- AND MOISTUREPROOF COATED PAPERBOARD

Samuel Bergstein, Cincinnati, Ohio, assignor to Robert Morris Bergstein and Frank David Bergstein, trustees No Drawing. Application August 14, 1944, Serial No. 549,480

4 Claims. (Cl. 117—158)

My invention relates to the coating of a surface of paperboard (which paperboard is to be converted into containers for food products or the like), the coating being such as to provide protection from the penetration both of grease and moisture. It is a principal object of my invention to provide a coating, and a method of applying it to the paperboard, and the like such that the desired protective characteristics are achieved with very low cost materials, and in a single operation employing inexpensive equipment.

This object and others, which include the solution of particular problems as will hereinafter be set forth and which will be made clear herein or will be apparent to one skilled in the art upon reading these specifications, I accomplish by that coating, coated product and process of producing it, of which I shall now describe certain exemplary embodiments.

In the paperboard carton art, moistureproofness and, where desired, liquidproofness have hitherto been attained through the use of paraffin wax. Paraffin, while inexpensive, has certain disadvantages. It is the general practice to apply the paraffin either to finished container blanks or to finished and erected containers closed on one end. Paraffin forms a relatively fragile coating subject to disruption when the paperboard is bent. Paraffin is not greaseproof and provides moisture resistance only.

The need for greaseproofing has been recognized in the provision of boxes for food products containing oils or greasy substances, for example, cakes and other bakery goods, including doughnuts. The common commercial treatment of this problem involved laminating greaseproof paper, such as vegetable parchment, or glassine (which is also greaseproof) to paperboard, the glassine side being used for the inner surface of containers made from such laminated products. But the laminating of glassine or other greaseproof papers to paperboard produces a high cost product.

Attempts have also been made to coat paperboard with various high cost substances including cellulose lacquers, resins and the like to secure greaseproofness; but while greaseproofness can be secured with single or composite coatings of various ones of such substances, the product is again a high cost product and frequently not especially desirable for handling in the operations of making boxes. Also, such products are usually deficient in moistureproofness. The laminated product is the one which has come into the widest commercial use, because it provides moisture resistance as well as greaseproofness.

There has not hitherto been a satisfactory, cheap, coated paperboard for the manufacture of cartons or containers in which an interior coating provided the desired grease- and moistureproofness, as hereinafter explained. The desirable qualities of such a product are these:

1. *Greaseproofness.*—The product should have a coating on one surface at least which is highly resistant to the penetration of animal fats, such as lard, or vegetable oils, such as hydrogenated cottonseed oil, shortenings and the like, in order to prevent staining of the board and the consequent rapid increase in rancidity.

2. *Moisture- and vaporproofness.*—The coating should impart to the board a sufficiently high degree of resistance to penetration by moisture and vapor to prevent food products from drying out and becoming stale too rapidly.

3. *Freedom from odor and toxicity.*—It is obvious that a coating for foodstuff containers should possess no odor nor any degree of toxicity.

4. *Air tightness.*—This quality is to be distinguished from resistance to moisture and vapor. I use the term "air tightness" to mean the quality of blocking odors, whether the purpose be the protection of the contents of the container from contamination by foreign odors or the prevention of loss of aromatic values by the contents of the container.

In this connection it may be pointed out that ordinary boxboard is made from waste paper collected from various sources and has a characteristic odor. One of the functions of a coating which is air tight is to protect the contents of the container from contamination with the odor of the paperboard.

5. *Low cost.*—Both the coating composition and its method of application should be such as to permit the lowest possible cost, since food products are distributed in large volume, and are bulky in relation to dollar value. Hence, protection must be attained at the most economical level possible so as not to make it necessary to raise the selling price.

6. *Handleability.*—The coating imposed upon the boxboard should not be such as to interfere with the normal operations of producing cartons and containers. It must neither be so fragile as to be disrupted by normal handling operations, nor must it be tacky so as to make sheet separation difficult. It is an advantage to precoat paperboard on one side in bulk, and then carry on the various operations of printing, cutting, scoring and the like involved in container production. The coating should be such as to permit these operations.

So far as I can ascertain, there has not hitherto been a commercial product meeting all of these requirements.

In the manufacture of the laminated product, to which I have referred above, the glassine or greaseproof paper has been adhered to the paperboard in many instances through the use of microcrystalline wax. Microcrystalline wax, however, has not been found suitable for providing exposed interior greaseproof coatings on boxboard. The technical literature in the paperboard industry states that greaseproofness cannot be obtained through the use, as exposed coatings, either of paraffin or of microcrystalline wax.

It has been known that the solubility of microcrystalline wax in vegetable and animal oils is very low; but in spite of this apparent grease resistance of the substance itself, attempts to use it as an exposed coating for the interior face of boxboard to be made into grease resistant cartons and containers have uniformly met with failure. I have found that microcrystalline wax is not a good film forming substance, and I believe that the failure of the prior art was principally due to the formation of coatings which were not continuous, so that the apparent lack of grease resistance was due to penetration of interstices in the coating, rather than to solution or softening of the microcrystalline wax by the oils or greases involved.

But microcrystalline wax has another and serious disadvantage in view of the objects of this invention. It forms a tacky or highly frictional coating so that it tends to destroy the handleability of the coated board.

I have discovered that a mixture of microcrystalline wax and paraffin in certain ratios provides a coating composition which, applied in the proper way, as hereinafter taught, may be used to produce a coated paperboard attaining the objects of this invention.

By microcrystalline wax, I mean those amorphous or microcrystalline waxy substances derived from petroleum and which are ordinarily made by separating petrolatum from residual stocks by centrifuge or solvent separation and then further treating the petrolatum by selective solvent separation or by re-centrifuging. The customary melting point range of microcrystalline waxes is from 140 to 200° F.

By paraffin or paraffin wax, I mean crystalline petroleum products which are removed from distillates or overhead stocks by sweating or solvent separation. These waxes ordinarily have a melting point in the general range of 120 to 150° F.

It has hitherto been known that paraffin and microcrystalline waxes may be blended together, and some use has been made of mixtures of the two waxes as dipping baths for externally coating wrapped or sealed packages to protect them from dampness or moisture. The microcrystalline wax in this instance was added simply to make the coating more flexible. Without it the paraffin would be brittle and more fragile.

I have discovered, however, that under certain circumstances considerable quantities of paraffin, not grease resistant in itself, may be added to the microcrystalline wax without impairing the greaseproofness of the latter, while imparting to the microcrystalline wax a film forming property such that in proper procedures, continuous greaseproof films may be formed on paperboard. At the same time it destroys the tackiness and frictional quality of the microcrystalline wax, so as to make possible the production of a handleable board. Also, when boxes are made of such coated board and are shipped with the walls folded inwardly, thereby bringing coated surfaces of the walls into contact with coated surfaces of the main box panels, these parts do not stick to one another.

In the practice of my invention, I employ mixtures of paraffin and microcrystalline waxes wherein the paraffin may range from 20 to 85% and the microcrystalline wax from 80 to 15% of the mixture of the two substances. The higher the melting point of the microcrystalline wax, the more grease resistant it is when in combination with the paraffin. Hence, the quantity of paraffin added to the microcrystalline wax should be roughly proportioned to the melting point of the microcrystalline wax. For example, I have found that a film formed from a substance containing 20 parts by weight of microcrystalline wax having a melting point of 160° F. and 80 parts by weight of paraffin having a melting point of 130° would resist the penetration of flowing vegetable oil for as many as five or six days. With microcrystalline wax of higher melting point, say, in the neighborhood of 190° F. or higher, 15 parts of such wax to 80 parts of the paraffin would produce the same resistance.

In my mixtures, the paraffin modifies the microcrystalline wax, causing it to become non-tacky and enabling it to produce continuous films on boxboard when properly applied to it, while the microcrystalline wax modifies the paraffin by causing the mixture to become non-brittle while retaining its grease resistance.

In the employment of my compositions, as will hereinafter be set forth more at length, I have found that the coating substance should be applied to the paperboard in molten form, but at a temperature not in excess of 45° F. above the melting point of the composition.

Better results are obtained the closer the molten composition is to its melting point at the time of its application to the board. I prefer to work about five or ten degrees above the melting point.

The melting point of a mixture of paraffin and microcrystalline wax will be determined both by the characteristics of the two substances and the proportions of them in the mixture. For example, with equal parts of microcrystalline wax having a melting point of 160° F. and paraffin having a melting point of 130°, the composition has a melting point of about 145° F., and best results will be achieved by applying it to the paperboard in a temperature range of approximately 150 to 190° F. If equal parts of a microcrystalline wax having a melting point of 180° F. and paraffin having a melting point of 130° are used, the melting point of the composition is about 155° F. and slightly higher coating temperatures may be employed. The same ingredients in different proportions likewise give different melting points for the mixture.

If the composition is applied to the paperboard at too high a temperature, it exhibits a tendency to strike into the paperboard to such an extent as to impair the continuity of the film, and hence, its grease- and moistureproofness. Properly applied and chilled, however, as hereinafter set forth, my coatings provide smooth, glossy, tack-free surfaces, having great grease resistance, moisture resistance, and the other qualities to which reference has been made above.

I have found that my coating compositions may be still further improved through the use of minor quantities of resinous substances, as hereinafter defined. These resins act to harden the coating, and to increase the anchorage of the coating to the paperboard. At the same time, however, they increase the viscosity of the wax mixture, thus decreasing penetration into or absorption of the coating by the paperboard. The resins also increase the resistance of films formed by the wax mixture to the passage of odors.

The materials to which I have referred by the term "resin" are materials compatible with the waxes which I employ, and are found in the following groups:

(1) Natural rosin, such as wood rosin, copal, dammar, kauri, and the like.

(2) Modified rosins, such as polymerized rosins, "disproportionated rosins," and the like. For example, materials sold under the trade name "Polypale," manufactured by the Hercules Powder Company, and hydrogenated rosins, such as those sold under the trade name "Staybelite" by the same company, may be employed.

(3) Ester gums of natural or modified rosins.

(4) Other hydrocarbon resins, such as the following: Terpene polymers, such as those supplied by Neville Products Company under the trade name "Nypene," or as supplied by the Pennsylvania Industrial Chemical Company under the trade name "Piccolyte," coumarone and coumarone-indene resins and their modifications, naphthalene polymers, or cycloparaffin, such for example, as that supplied by the Neville Products Company under the trade name "Nevilite."

(5) Resin modified alkyds and phenolic resins which have sufficient compatibility with the waxes I employ.

These resinous substances are employed in minor amounts and do not add significantly to the cost of my compositions.

The following are representative examples of compositions successfully employed by me:

*Example 1*

| | Parts by Weight | Melting Point |
|---|---|---|
| | | °F. |
| 170° F. microcrystalline wax | 15 | 136 |
| 132° F. refined paraffin wax | 85 | |

*Example 2*

| | Parts by Weight | Melting Point |
|---|---|---|
| | | °F. |
| 170° F. microcrystalline wax | 50 | 151 |
| 132° F. paraffin wax | 50 | |

*Example 3*

| | Parts by Weight | Melting Point |
|---|---|---|
| | | °F. |
| 166° F. microcrystalline wax | 80 | 160 |
| 132° F. refined paraffin wax | 20 | |

*Example 4*

| | Parts by Weight | Melting Point |
|---|---|---|
| | | °F. |
| 166° F. microcrystalline wax | 20 | 142 |
| 132° F. refined paraffin wax | 80 | |
| Hydrogenated rosin (Staybelite) | 3 | |

*Example 5*

| | Parts by Weight | Melting Point |
|---|---|---|
| | | °F. |
| 170° F. microcrystalline wax | 50 | 155 |
| 135° F. paraffin wax | 50 | |
| Terpene Polymer (Nypene) | 10 | |

*Example 6*

| | Parts by Weight | Melting Point |
|---|---|---|
| | | °F. |
| 170° F. microcrystalline wax | 60 | 165 |
| 128° F. paraffin wax | 40 | |
| Polymerized rosin (Polypale) | 30 | |

*Example 7*

| | Parts by Weight | Melting Point |
|---|---|---|
| | | °F. |
| 170° F. microcrystalline wax | 25 | 151 |
| 166° F. microcrystalline wax | 25 | |
| 130° F. paraffin wax | 50 | |
| Hydrogenated rosin (Staybelite) | 5 | |
| Terpene Polymer (Nypene) | 5 | |

Melting points as referred to herein are determined by the ASTM standard ball and ring test.

The coating may be done by means of a coating machine equipped for the application of melted thermoplastic materials, providing the machine has adequate temperature controlling means. As I have already indicated, the temperature is maintained accurately within a range not exceeding 45° above the melting point of the composition itself. The machine should be capable of applying a uniform coating smoothly. Various types of roller coating or blade coating machines may be employed.

An exemplary coating machine comprises a coating roll turning in a pan of heated thermoplastic coating material. The pan is equipped with heating means such as electrical heaters, and thermostatic temperature control means for accurate temperature maintenance, or else is heated by a medium of known temperature, such as steam at a desired pressure in a steam jacket. A doctor blade adjacent the surface of the coating roll controls the thickness of the film of coating substance formed thereon. The boxboard is led over the coating roll and will be pressed into contact with the film by a pressure roll.

The film of coating substance is picked up by the boxboard which immediately leaves the coating roll, whereupon the film begins to cool in air. Near the coating roll is a heated smoothing bar over which the boxboard passes. The film applied by the coating roll is usually and preferably slightly thicker than the desired final thickness. The smoothing bar acts not only to smooth out irregularities or ripples in the film applied by the coating roll but also to remove excess coating so that the final film is accurate and continuous. The smoothing bar is usually electrically heated, and may be heated to a higher temperature than the temperature of the thermoplastic in the pan, since the contact of the boxboard with it is very brief. It may be located near enough to the coating roll so that excess removed by it will return to the pan.

The film on the boxboard thereafter cools in air, and this may be a sufficiently rapid chilling or cooling. However, I prefer to pass the coated board partially around the surface of a cooled chill roll before rewinding it.

The coating of the board may be done at the end of the paper making machine or it may be done upon rewinding paperboard from a roll. While I am not so limited, I prefer for convenience and economy to coat or treat the paperboard in the form of a continuous web which thereafter may be formed into containers or severed into unit sheets for the purpose.

I have found that if coatings such as I have described are applied within the temperature ranges set forth to paperboard and are allowed to chill relatively rapidly, the coating acquires the property of a continuous film having the desired characteristics to which reference has been made. My coatings are ordinarily applied in a film about one-thousandth of an inch thick. It may be thicker if desired. I ordinarily employ about seven pounds of the coating material per 1000 square feet of board, or from 100 to 250 pounds per ton of board, depending upon the area of board surface per ton.

To illustrate the protective characteristics provided by board processed according to my invention, a comparative table is submitted below. In preparing the samples for the test used in connection with this table, compositions of each of the eight representative examples were prepared. Each composition was brought into molten condition, the ingredients being readily compatible in molten form and forming a uniform molten composition. Thereafter, at a temperature not in excess of 45° over the melting point of the respective composition, each was applied as a surface coating of the inner surface of sheets of standard .022 bleached manila lined chip, which grade of paperboard was selected because it is an average and representative type and grade used in the fabricating of boxes and cartons for bakery products, etc. The composition was applied on a basis weight of a minimum of 7 pounds per thousand square feet of boxboard by means of a suitable coating machine equipped with a heated pan and coating roll, and a heated secondary smoothing bar to provide a uniform continuous film of the composition, as hereinabove described. It should be noted also that in each case the board so coated presented a smooth, non-tacky surface suitable for subsequent scoring, cutting and fabricating operations.

Table

|  | Animal Fat (Lard) Penetration | Vegetable Oil (Wesson) Penetration | Air Penetration c. c. per Day |
|---|---|---|---|
| Example 1 | 15 hr | 15 hr | 7 cc. |
| Example 2 | Over 30 da | 30 da | 5.5 cc. |
| Example 3 | 18 hr | 1 da | 6 cc. |
| Example 4 | 15 hr | 15 hr | 6 cc. |
| Example 5 | Over 30 da | 30 da | 3.5 cc. |
| Example 6 | Over 30 da | 30 da | 4 cc. |
| Example 7 | Over 30 da | 30 da | 3.5 cc. |
| Untreated | 5-15 min | 5-15 min | More than 100 cc. per hr. |

The coating was applied to the chip side, which is customarily the side forming the inner surface, when cartons or boxes are subsequently fabricated from such board. The board thus coated was cut into small squares approximately 4-in. square and the coated surface of each received a rather heavy application of animal fat (lard). The second series of these coated squares received a similar direct application of vegetable oil (Wesson oil). The results shown in the table above are the readings in hours and minutes of the time it took for the first stain to appear on the opposite side of this board, that is, on the bleached surface, at normal room temperature of approximately 70° F. The last item gives the reading for a sheet of the same .022 bleached manila lined chip board in its original, untreated form.

It should be noted that these tests are unduly severe as compared with conditions of actual use. The direct application of large masses of lard or large quantities of free vegetable oil direct to a coating has no little counterpart in the commercial packaging of food products. A product formed in accordance with my invention and resisting staining, under test with direct applications of lard or oil, for fifteen hours, would resist the penetration of fat from bakery goods for a matter of weeks, or far longer than the goods themselves would remain fresh and edible.

The column marked "Air Penetration" shows results obtained on a porosity device developed for this purpose. The device includes means for clamping the board pieces to be treated as in a gasket through which air must penetrate to effect a corresponding release of a given head of water from an overhead chamber to a lower chamber. The arrangement is such that the flow of water can take place only as the coated boxboard membrane permits the leakage of air through its surface. The resultant readings, as shown in the column, are in cubic centimeters per day, and indicate the relative porosity or air tightness of the respective examples, and the comparative porosity or air tightness of the untreated board.

The standard Petry test for determining moisture-vapor penetration as well as practical tests with cartons made from my treated board packed with doughnuts or other soft bakery goods show that the moisture-vapor-proofness of my treated boxboard and of cartons and containers made from it is as high as any heretofore attained in commercial practice.

Modifications may be made in my invention without departing from the spirit of it.

Having thus described my invention in certain exemplary embodiments, what I claim as new and desire to secure by Letters Patent is:

1. A process of treating a flexible, porous, fibrous web to render a surface of it resistant to grease, moisture and air penetration, which comprises preparing a mixture of paraffin and microcrystalline wax in proportions of substantially 85 to 20% paraffin and 15 to 80% microcrystalline wax, bringing said mixture to a temperature above its melting point but less than substantially 45° above its melting point, applying said mixture while at said temperature to the surface of boxboard substantially at room temperature, and permitting said mixture to cool quickly, to provide on said boxboard a continuous, imperforate, superficial film which at room temperature is non-tacky, and which is commercially resistant to moisture, water vapor and vegetable and animal fats and oils.

2. The process claimed in claim 1, wherein a minor quantity of a resin is first added to said mixture.

3. A process of treating boxboard to render a surface of it resistant to grease, moisture and air penetration, which comprises preparing a mixture of paraffin and microcrystalline wax in proportions of substantially 85 to 20% paraffin and 15 to 80% microcrystalline wax, bringing said mixture to a temperature above its melting point but less than substantially 45° above its melting point, applying said mixture while at said temperature to the surface of boxboard, which surface is substantially at room temperature, and allowing the mixture to cool quickly, to provide thereon a continuous superficial film which at room temperature is non-tacky, and thereafter passing said coated boxboard over a heated smoothing surface to insure consolidation of said film.

4. The process claimed in claim 1 wherein a minor quantity of a resin is first added to said mixture, and which includes the step of passing said coated web over a heated smoothing surface to insure consolidation of said film.

SAMUEL BERGSTEIN.

REFERENCES CITED

The following references are of record in the file of this patent:

UNITED STATES PATENTS

| Number | Name | Date |
|---|---|---|
| 1,968,907 | Pearsall | Aug. 7, 1934 |
| 2,031,036 | Dreymann | Feb. 18, 1936 |
| 2,322,198 | Parsons | June 15, 1943 |
| 2,348,687 | Abrams et al. | May 9, 1944 |
| 2,348,689 | Abrams | May 9, 1944 |

OTHER REFERENCES

I. Tappi Bulletin No. 8, Mar. 29, 1943, page 3.
II. Tappi Bulletin No. 27, Mar. 13, 1944, pages 1 and 2.
III. Technical Association Papers, Series 26, June 1943, pages 528–530. (Publications I, II and III are published by the Technical Assoc. of the Pulp and Paper Industry.)